US011319413B2

(12) United States Patent
Uta et al.

(10) Patent No.: US 11,319,413 B2
(45) Date of Patent: May 3, 2022

(54) ORGANOPOLYSILOXANE COMPOSITION, AND ORGANIC SILICON COMPOUND AND PRODUCTION METHOD THEREFOR

(71) Applicant: SHIN-ETSU CHEMICAL CO., LTD., Tokyo (JP)

(72) Inventors: Akira Uta, Annaka (JP); Takafumi Sakamoto, Annaka (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 0 days.

(21) Appl. No.: 16/760,074

(22) PCT Filed: Oct. 9, 2018

(86) PCT No.: PCT/JP2018/037526
§ 371 (c)(1),
(2) Date: Apr. 29, 2020

(87) PCT Pub. No.: WO2019/087697
PCT Pub. Date: May 9, 2019

(65) Prior Publication Data
US 2021/0206924 A1 Jul. 8, 2021

(30) Foreign Application Priority Data

Oct. 31, 2017 (JP) .............................. JP2017-210246
Oct. 31, 2017 (JP) .............................. JP2017-210283

(51) Int. Cl.
C07F 7/04 (2006.01)
C08G 77/16 (2006.01)
C07F 7/18 (2006.01)
C08G 77/24 (2006.01)
C08K 5/5419 (2006.01)
C08G 77/60 (2006.01)

(52) U.S. Cl.
CPC ............ C08G 77/16 (2013.01); C07F 7/1876 (2013.01); C08G 77/24 (2013.01); C08K 5/5419 (2013.01); C07F 7/04 (2013.01); C08G 77/60 (2013.01)

(58) Field of Classification Search
CPC .................................. C07F 7/04; C08G 77/60
USPC .................................................. 556/438, 442
See application file for complete search history.

(56) References Cited

U.S. PATENT DOCUMENTS

| 4,604,478 | A | * | 8/1986 | Juen ....................... C08G 77/60 556/438 |
| 5,405,766 | A | | 4/1995 | Kallury et al. |
| 6,645,339 | B1 | | 11/2003 | DeCato |
| 2005/0070729 | A1 | | 3/2005 | Kiyomori et al. |
| 2005/0137361 | A1 | | 6/2005 | Sakamoto et al. |
| 2005/0228091 | A1 | | 10/2005 | Kimura et al. |
| 2006/0084727 | A1 | | 4/2006 | Yan et al. |
| 2007/0179244 | A1 | | 8/2007 | Araki et al. |
| 2016/0319079 | A1 | * | 11/2016 | Koellnberger ........ C09D 183/06 |
| 2017/0042787 | A1 | * | 2/2017 | Phukan .................. A61Q 19/02 |

FOREIGN PATENT DOCUMENTS

| JP | 2-282389 A | 11/1990 |
| JP | 6-220313 A | 8/1994 |
| JP | 9-12861 A | 1/1997 |
| JP | 2003-535152 A | 11/2003 |
| JP | 2004-307723 A | 11/2004 |
| JP | 2005-97173 A | 4/2005 |
| JP | 2005-298558 A | 10/2005 |
| JP | 2006-156964 A | 6/2006 |
| JP | 3818365 B2 | 9/2006 |
| JP | 2007-204575 A | 8/2007 |
| JP | 2008-163143 A | 7/2008 |
| JP | 4553110 B2 | 9/2010 |
| JP | 2018-70480 A | 5/2018 |

OTHER PUBLICATIONS

Abe et al., "Construction of Bioactive Peptide Orientation-Immobilized Surfaces with Interposed Liquid Crystal Substrates", Journal of Japanese Society for Biomaterials, 1997, vol. 15, No. 3, pp. 113-120, total 10 pages.
Annis et al., "Polymer-Supported Chiral Co(Salen) Complexes: Synthetic Applications and Mechanistic Investigations in the Hydrolytic Kinetic Resolution of Terminal Epoxides", Journal of the American Chemical Society, 1999, vol. 121, No. 17, pp. 4147-4154, total 8 pages.
International Search Report, issued in PCT/JP2018/037526, PCT/ISA/210, dated Dec. 18, 2018.
Petrunin et al., "Interphase interactions in the metal-siloxane anticorrosion coating system", Zashchita Metallov, 1990, vol. 26, No. 5, pp. 759-765, total 11 pages.
Severnyi et al., "Effect of coupling agents on the adhesion properties of compositions based on siloxane rubbers of cold vulcanization", Kauchuki Rezina, 1976, vol. 11, pp. 12-15, total 8 pages.
Written Opinion of the International Searching Authority, issued in PCT/JP2018/037526, PCT/ISA/237, dated Dec. 18, 2018.

* cited by examiner

Primary Examiner — Margaret G Moore
(74) Attorney, Agent, or Firm — Birch, Stewart, Kolasch & Birch, LLP

(57) ABSTRACT

This organopolysiloxane composition, when cured at room temperature by moisture in the atmosphere, provides a silicone rubber cured product having good self-adhesiveness to a magnesium alloy. The organopolysiloxane composition contains (A) an organopolysiloxane having a hydroxy group and/or a hydrolysable silyl group at both ends of the molecular chain, (B) an organic silicon compound other than (A) and (C), having at least three hydrolysable groups bonded to a silicon atom per molecule, and/or a partial hydrolysis-condensation product thereof, and (C) a silane coupling agent having a specific molecular structure having a carboxylic acid silyl ester bond. Furthermore, a novel compound, having an alkoxysilyl group and a carboxylic acid silyl ester group per molecule, can have improved adhesiveness/bonding properties with respect to a base material due to the effect of carboxylic acid after hydrolysis thereof.

9 Claims, No Drawings

ORGANOPOLYSILOXANE COMPOSITION, AND ORGANIC SILICON COMPOUND AND PRODUCTION METHOD THEREFOR

TECHNICAL FIELD

The present invention relates to an organopolysiloxane composition that provides a silicone rubber cured product exhibiting excellent magnesium alloy adhesion by being cured at room temperature.

The present invention also relates to a novel organic silicon compound, hi particular, the present invention relates to a novel carboxylic acid silyl ester group-containing organic silicon compound useful as a silane coupling agent, a silylating agent, an adhesion aid, and the like, and a production method therefor.

BACKGROUND ART

A silicone rubber obtained by curing a room temperature-curable organopolysiloxane composition (so-called silicone rubber composition) is excellent in safety, and durability and adhesive properties as a rubber, and therefore is widely used in a building-related field, a transport-related field, an electric/electronic part-related field, and the like.

An application of a cured product of a room temperature-curable organopolysiloxane composition (silicone rubber cured product) often requires high adhesive properties. By adding, as a tackifier, a hydrolyzable organosilane compound having a functional group-containing monovalent hydrocarbon group such as an amino group, an epoxy group, a methacryl group, or a mercapto group (a carbon functional silane or a silane coupling agent) to the room temperature-curable organopolysiloxane composition, stickiness and adhesion to a substrate have been improved.

Conventionally, as an amino group-containing alkoxysilane compound, γ-aminopropyl triethoxysilane, γ-aminopropyl trimethoxysilane, γ-aminopropyl methyldimethoxysilane, γ-aminopropyl methyldiethoxysilane, N-β-aminoethyl-γ-aminopropyl methyldimethoxysilane, N-benzyl-γ-aminopropyl trimethoxysilane, N-phenyl-γ-aminopropyl trimethoxysilane, β-aminoethylaminomethyl phenethyl trimethoxysilane, N-[m-aminomethylphenylmethyl]-γ-aminopropyl trimethoxysilane, and the like are known (Patent Document 1: JP-A 2008-163143), and as an epoxy group-containing alkoxysilane compound, 2-(3,4-epoxy cyclohexyl)) ethyltrimethoxysilane, 3-glycidoxypropyl trimethoxysilane, 3-glycidoxypropyl methyldiethoxysilane, 3-glycidoxypropyl triethoxysilane, and the like are known (Patent Document 2: JP-A 2004-307723). As a methacryl group-containing alkoxysilane compound, 3-methacryloxypropyl trimethoxysilane, 3-methacryloxypropyl triethoxysilane, 3-methacryloxypropyl methyldimethoxysilane, 3-methacryloxypropyl methyldiethoxysilane, and the like are known (Patent Document 3: JP-A 2006-156964), and as a mercapto group-containing alkoxysilane compound, 3-mercaptopropyl trimethoxysilane, 3-mercaptopropyl methyldimethoxysilane, and the like are known (Patent Document 4: JP-A H09-12861). As described above, a large number of alkoxysilane compounds have already been used as adhesion aids, but a demand for improving stickiness/adhesion to a substrate has been increasing year by year.

Meanwhile, in recent years, a magnesium alloy represented by AZ-91D has been often used for an information electronic device such as a mobile phone, a digital video, a digital camera, a liquid crystal projector, a plasma display, a personal computer, an MD player, or a DVD recorder, and a transport device member such as an electrical component, an automotive oil pan, an intake manifold, a lock housing component, a steering upper bracket, or a steering wheel due to characteristics of light weight, high strength, corrosion resistance, designability, and recyclability. An organopolysiloxane composition for adhering to a magnesium alloy, having good self-adhesion to these members is required.

However, the magnesium alloy is an adherend having very poor adhesiveness, and therefore a chemical conversion treatment is indispensable for adhering to the magnesium alloy. Studies of a sealant and an adhesive agent exhibiting good self-adhesion without the treatment have not been often performed so far. That is, only the following several methods have been proposed so far for an organopolysiloxane composition having self-adhesion to a magnesium alloy. JP-A 2003-535152 (Patent Document 5) proposes a composition comprising a curable silicone, a filler and an amino group-containing silane adhesion promoter. JP 3818365 (Patent Document 6) proposes a composition using a silicone oil and an inorganic compound containing a metal element having a smaller ionization tendency than magnesium as a curing agent. JP 4553110 (Patent Document 7) achieves adhesion to a magnesium alloy by using an acidic silane coupling agent in which a 5% silane coupling agent aqueous solution has a pH of 7 or less. Furthermore, JP-A 2007-204575 (Patent Document 8) reports adhesion to a magnesium alloy by using a base oil, an organopolysiloxane having a terminal silethylene bond, and a zinc compound as a filler. However, in Patent Document 5, effectiveness of the amino group-containing silane adhesion promoter such as γ-aminopropyl trialkoxysilane or trialkoxypropyl ethylenediamine is insufficient. In Patent Documents 6 and 8, there is a restriction by a filler and a base oil used, and therefore Patent Documents 6 and 8 lack flexibility in material design. Patent Document 7 has a drawback that use of the acidic silane coupling agent exemplified results in a decrease in adhesion to a magnesium alloy after a chemical resistance test.

PRIOR ART DOCUMENTS

Patent Documents

Patent Document 1: JP-A 2008-163143
Patent Document 2: JP-A 2004-307723
Patent Document 3: JP-A 2006-156964
Patent Document 4: JP-A H09-12861
Patent Document 5: JP-A 2003-535152
Patent Document 6: JP 3818365
Patent Document 7: JP 4553110
Patent Document 8: JP-A 2007-204575

SUMMARY OF INVENTION

Technical Problem

An object of the invention, which has been made under the above-mentioned circumstances, is to provide an organopolysiloxane composition that cures at room temperature by moisture in the atmosphere (crosslinking by a condensation reaction) to provide a silicone rubber cured product having good self-adhesion to a magnesium alloy, particularly to provide an organopolysiloxane composition for adhering to a magnesium alloy.

Another object of the present invention is to provide a novel organic silicon compound useful for a silane coupling agent, a silylating agent, an adhesion aid, and the like for improving stickiness/adhesion to a substrate, and a production method therefor.

Solution to Problem

The present inventors made intensive studies in order to achieve the above object. As a result, the present inventors have found that by using a compound having both an alkoxysilyl group and a carboxylic acid silyl ester group represented by the following general formula (3) in one molecule, stickiness/adhesion to a substrate can be improved due to an effect of a carboxylic acid after its hydrolysis reaction.

Furthermore, the present inventors made intensive studies focusing on specificity of a magnesium alloy adherend. As a result, the present inventors have found that an organopolysiloxane composition comprising (A) an organopolysiloxane represented by the following general formula (1) and/or (2), (B) an organic silicon compound other than components (A) and (C), having at least three silicon-bonded hydrolyzable groups in one molecule, and/or a partial hydrolytic condensate thereof, (C) a silane coupling agent having a specific molecular structure having a carboxylic acid silyl ester bond, represented by the following general formula (3), and preferably (D) at least one filler provides a silicone rubber cured product having good self-adhesion to a magnesium alloy by being cured at room temperature (23° C.±10° C.) by moisture in the atmosphere (crosslinking by a condensation reaction).

That is, for a general adherend represented by glass, an amino group-containing silane adhesion promoter is effective. However, for a magnesium alloy, as is clear from the following results of Comparative Examples using 3-aminopropyl trimethoxysilane, the amino group-containing silane adhesion promoter has poor adhesive properties. The present inventors have found that use of a silane coupling agent having a specific molecular structure having a carboxylic acid silyl ester bond dramatically improves adhesion to a magnesium alloy, and that excellent chemical resistance is achieved as compared with prior art, thus completing the present invention.

That is, the present invention provides an organopolysiloxane composition, an organic silicon compound and a production method therefor, as defined below.

[1]

An organopolysiloxane composition comprising:
(A) 100 parts by weight of an organopolysiloxane having the general formula (1) and/or (2), $$HO(SiR_2O)_nH \quad (1):$$

wherein R is independently an unsubstituted or halogen-substituted $C_1$-$C_{10}$ monovalent hydrocarbon group and n is an integer of at least 10,

[Chem. 1]

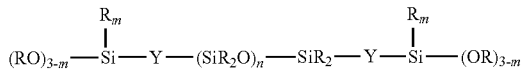

wherein R and n are as defined above, Y is oxygen atom or a $C_2$-$C_5$ alkylene group and m is independently 0 or 1;
(B) 0.1 to 50 parts by weight of an organic silicon compound other than components (A) and (C), having at least three silicon-bonded hydrolyzable groups in one molecule, and/or a partial hydrolytic condensate thereof; and
(C) 0.1 to 15 parts by weight of a silane coupling agent having the general formula (3):

[Chem. 2]

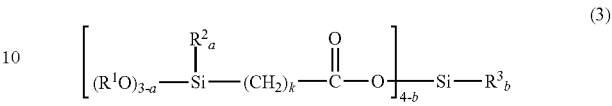

wherein $R^1$, $R^2$, and $R^3$ are each independently a $C_1$-$C_{10}$ monovalent hydrocarbon group, k is an integer of 3 to 14, a is an integer of 0 to 2 and b is an integer of 0 to 3.

[2]

The organopolysiloxane composition according to [1], wherein component (B) is a hydrolyzable organosilane compound having the general formula (4) and/or a partial hydrolytic condensate thereof:

$$R^4_cSiR^5_{4-c} \quad (4)$$

wherein $R^4$ is a monovalent hydrocarbon group, $R^5$ is a hydrolyzable group and c is 0 or 1.

[3]

The organopolysiloxane composition according to [1] or [2], further comprising at least one filler as component (D) in an amount of 1 to 500 parts by weight per 100 parts by weight of component (A).

[4]

The organopolysiloxane composition according to any one of [1] to [3], which is used for adhering to a magnesium alloy.

[5]

An organic silicon compound having the general formula (3a):

[Chem. 3]

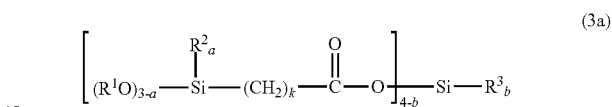

wherein $R^1$, $R^2$, and $R^3$ are each independently a $C_1$-$C_{10}$ monovalent hydrocarbon group, k is an integer of 3 to 14, a is an integer of 0 to 2 and b is an integer of 0 to 3, with the proviso that k is an integer of 6 to 14 in a case where $R^3$ is an aliphatic saturated monovalent hydrocarbon group and b=3.

[6]

A method for producing an organic silicon compound having the general formula (3a):

[Chem. 6]

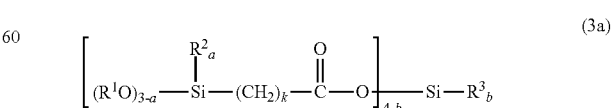

wherein $R^1$, $R^2$ and $R^3$ are each independently a $C_1$-$C_{10}$ monovalent hydrocarbon group, a is an integer of 0 to 2, b is an integer of 0 to 3 and k is an integer of 3 to 14, with the proviso that k is an integer of 6 to 14 in a case where $R^3$ is an aliphatic saturated monovalent hydrocarbon group and b=3, the method comprising a step of causing a reaction between a carboxylic acid silyl ester compound having an aliphatic unsaturated group at a terminal, represented by the general formula (5):

[Chem. 4]

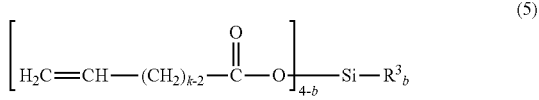

(5)

wherein $R^3$, b and k are as defined above, with the proviso that k is an integer of 6 to 14 in a case where $R^3$ is an aliphatic saturated monovalent hydrocarbon group and b=3, and an alkoxysilane having the general formula (8):

[Chem. 5]

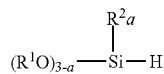

(8)

wherein $R^1$, $R^2$ and a are as defined above.

[7]

The method for producing an organic silicon compound according to [6], wherein the carboxylic acid silyl ester compound having an aliphatic unsaturated group at a terminal, represented by the general formula (5) is obtained by a reaction between a carboxylic acid having an aliphatic unsaturated group at a terminal, represented by the general formula (6):

[Chem. 7]

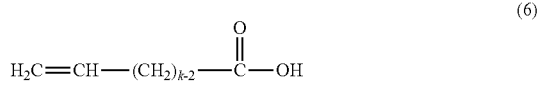

(6)

wherein k is as defined above, and a halosilane having the general formula (7):

[Chem. 8]

(7)

wherein $R^3$ and b are as defined above, and X is a halogen atom.

Advantageous Effects of Invention

The organopolysiloxane composition of the present invention provides a silicone rubber cured product exhibiting excellent magnesium alloy adhesion by being cured at room temperature, and is particularly useful as an organopolysiloxane composition for adhering to a magnesium alloy.

In addition, the novel organic silicon compound of the present invention has an alkoxysilyl group and a carboxylic acid silyl ester group in one molecule, and regenerates a highly active carboxyl group by hydrolysis. Therefore, the room temperature-curable organopolysiloxane composition including the organic silicon compound exhibits high stickiness/adhesive properties to a substrate.

DESCRIPTION OF EMBODIMENTS

The organopolysiloxane composition of the present invention contains the following components (A) to (C).

(A) an organopolysiloxane having the general formula (1) and/or (2):

$$HO(SiR_2O)_nH \quad (1)$$

wherein R is independently an unsubstituted or halogen-substituted $C_1$-$C_{10}$ monovalent hydrocarbon group and n is an integer of at least 10,

[Chem. 9]

(2)

wherein R and n are as defined above, Y is oxygen atom or a $C_2$-$C_5$ alkylene group and m is independently 0 or 1;

(B) an organic silicon compound other than components (A) and (C), having at least three silicon-bonded hydrolyzable groups in one molecule, and/or a partial hydrolytic condensate thereof; and (C) a silane coupling agent having the general formula (3):

[Chem. 10]

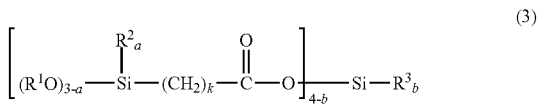

(3)

wherein $R^1$, $R^2$, and $R^3$ are each independently a $C_1$-$C_{10}$ monovalent hydrocarbon group, k is an integer of 3 to 14, a is an integer of 0 to 2 and b is an integer of 0 to 3.

[Component (A)]

Component (A) used in the organopolysiloxane composition of the present invention is an organopolysiloxane to act as a main component (base polymer) of the composition, and is represented by the following general formula (1) and/or (2).

$$HO(SiR_2O)_nH \quad (1)$$

wherein R is independently an unsubstituted or halogen-substituted $C_1$-$C_{10}$ monovalent hydrocarbon group and n is an integer of at least 10,

[Chem. 11]

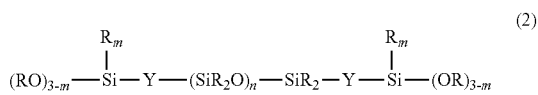

(2)

wherein R is independently an unsubstituted or halogen-substituted $C_1$-$C_{10}$ monovalent hydrocarbon group, n is an integer of at least 10, Y is oxygen atom or a $C_2$-$C_5$ alkylene group and m is independently 0 or 1.

In general formulas (1) and (2), R is an unsubstituted or halogen-substituted monovalent hydrocarbon group having 1 to 10 carbon atoms, and examples thereof include: alkyl groups such as methyl, ethyl, and propyl; cycloalkyl groups such as cyclohexyl; alkenyl groups such as vinyl and allyl; aryl groups such as phenyl and tolyl; and groups in which hydrogen atoms bonded to carbon atoms of these groups are partially replaced with halogen atoms, such as a 3,3,3-trifluoropropyl group. Among these groups, methyl, vinyl, phenyl, and 3,3,3-trifluoropropyl are preferable, and methyl is particularly preferable. A plurality of Rs in general formulas (1) and (2) may be the same group or different groups.

n is an integer of 10 or more, particularly an integer such that the viscosity of the diorganopolysiloxane at 25° C. is within a range of 25 to 500,000 mPas, preferably within a range of 500 to 100,000 mPa·s. Note that in the present invention, the viscosity is a value measured with a rotational viscometer (for example, a BL type, a BH type, a BS type, a cone plate type, or a rheometer) at 25° C. Specifically, a value of n that provides such a viscosity only needs to be an integer of usually about 10 to 2,000, preferably about 20 to 1,500, more preferably about 50 to 1,000.

In general formula (2), Y is an oxygen atom or an alkylene group having 2 to 5 carbon atoms, and examples of the alkylene group having 2 to 5 carbon atoms include ethylene, propylene, and butylene. Among these groups, Y preferably is an oxygen atom or ethylene.

ms each independently represent 0 or 1.

[Component (B)]

Component (B) used in the organopolysiloxane composition of the present invention acts as a crosslinking agent (curing agent), and is a hydrolyzable organic silicon compound other than components (A) and (C), having at least three hydrolyzable groups each bonded to a silicon atom in one molecule, and/or a partial hydrolytic condensate thereof. The organic silicon compound is preferably a hydrolyzable organosilane compound represented by the following general formula (4) and/or a partial hydrolytic condensate thereof (that is, an organosiloxane oligomer having at least two, preferably at least three residual hydrolyzable groups in a molecule generated by partially hydrolyzing and condensing the organosilane compound).

$$R^4{}_c SiR^5{}_{4-c} \quad (4)$$

wherein $R^4$ is a monovalent hydrocarbon group, and $R^5$ is a hydrolyzable group, c is 0 or 1, preferably 1.

In general formula (4), examples of the hydrolyzable group $R^5$ include a ketoxime group, an alkoxy group, an acyloxy group, and an alkenyloxy group. Specific examples thereof include: $C_3$-$C_8$ ketoxime groups such as dimethyl ketoxime, methyl ethyl ketoxime and methyl isobutyl ketoxime; $C_1$-$C_4$, particularly $C_1$ or $C_2$ alkoxy groups such as methoxy, ethoxy, propoxy, isopropoxy, butoxy, isobutoxy, sec-butoxy and tert-butoxy; $C_2$-$C_4$ acyloxy groups such as acetoxy and propionoxy, and $C_2$-$C_4$ alkenyloxy groups such as vinyloxy, allyloxy, propenoxy and isopropenoxy.

The remaining group $R^4$ bonded to a silicon atom other than hydrolyzable groups is not particularly limited as long as being a monovalent hydrocarbon group. Specific examples of the $R^4$ include a $C_1$-$C_{10}$ monovalent hydrocarbon group, for example, alkyl groups such as methyl, ethyl, propyl and butyl; alkenyl groups such as vinyl; and aryl groups such as phenyl. Among these groups, methyl, ethyl, vinyl and phenyl are preferable.

Specific examples of component (B) include: ketoxime silanes such as tetrakis(methylethylketoxime) silane, methyltris(dimethylketoxime) silane, methyltris(methylethylketoxime) silane, ethyltris(methylethylketoxime) silane, methyltris(methylisobutylketoxime) silane and vinyltris (methylethylketoxime) silane (also known as vinyltributanoxime silane); alkoxysilanes such as methyltrimethoxysilane, vinyltrimethoxysilane, phenyltrimethoxysilane, tetramethoxysilane, vinyltriethoxysilane and tetraethoxysilane; acetoxysilanes such as methyltriacetoxysilane and vinyltriacetoxysilane; isopropenoxysilanes such as methyltriisopropenoxysilane, vinylisopropenoxysilane and phenyltriisopropenoxysilane; and partial hydrolytic condensates thereof. These compounds may be used singly or in combination of two or more types thereof.

The amount of component (B) blended is 0.1 to 50 parts by weight, and preferably to 30 parts by weight per 100 parts by weight of component (A). If the amount is less than 0.1 parts by weight, sufficient crosslinking cannot be obtained, thereby failing to obtain a composition having desired rubber elasticity. If the amount exceeds 50 parts by weight, the obtained cured product tends to have low mechanical properties.

Note that component (B) represented by formula (4) is clearly differentiated from component (A) in having no repeating structure of a difunctional diorganosiloxane unit represented by $(SiR_2O)_n$ in a molecule thereof. In addition, component (B) is also clearly differentiated from the silane coupling agent of component (C) described later in being free of a carboxylic acid silyl ester bond in a molecule thereof.

[Component (C)]

Component (C) used in the organopolysiloxane composition of the present invention is a silane coupling agent, having 1 to 4 carboxylic acid silyl ester bonds in a molecule thereof, and is an essential component for imparting good magnesium alloy adhesive properties to a cured product (silicone rubber) obtained by curing the composition of the present invention at room temperature. As described in Patent Document 7, an acid-based silane coupling agent is effective for improving adhesion to a magnesium alloy. The silane coupling agent having a carboxylic acid silyl ester group used in the present invention has a carboxyl group protected with a silyl group while being uncured. However, the silane coupling agent regenerates a carboxyl group by removal of the silyl group due to hydrolysis while being cured, and thereby improves an adhesive strength to a magnesium alloy. In addition, by protecting a highly active carboxyl group with a silyl group, storage stability and chemical resistance are also improved.

The carboxylic acid silyl ester group-containing silane coupling agent according to the present invention has a structure represented by the general formula (3):

[Chem. 12]

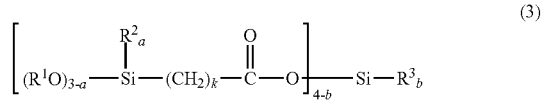

$$\left[ (R^1O)_{3-a} \underset{\underset{a}{|}}{\overset{R^2}{\underset{|}{Si}}} (CH_2)_k \overset{O}{\underset{\|}{C}} O \right]_{4-b} Si-R^3{}_b \quad (3)$$

wherein $R^1$, $R^2$, and $R^3$ are each independently a $C_1$-$C_{10}$ monovalent hydrocarbon group, k is an integer of 3 to 14, a is an integer of 0 to 2 and b is an integer of 0 to 3.

Here, in general formula (3), the $C_1$-$C_{10}$ monovalent hydrocarbon groups represented by $R^1$, $R^2$ or $R^3$ are preferably $C_1$-$C_7$ monovalent hydrocarbon groups. Among these groups, examples of $R^1$ constituting a hydrolyzable group as $R^1O$— include: saturated or unsaturated aliphatic hydrocarbon groups such as alkyl groups including methyl, ethyl, propyl and isopropyl, cycloalkyl groups including cyclohexy, and alkenyl groups including vinyl and allyl; and aromatic hydrocarbon groups such as aryl groups including phenyl and tolyl, and aralkyl groups including benzyl and phenyl ethyl. Among these groups, groups having 1 to 7 carbon atoms are preferable. For example, alkyl groups such as methyl, ethyl, propyl and isopropyl are preferable, and methyl and ethyl are particularly preferable.

Examples of $R^2$ include: saturated or unsaturated aliphatic hydrocarbon groups such as alkyl groups including methyl, ethyl, propyl and isopropyl, cycloalkyl groups including cyclohexyl group, and alkenyl groups including vinyl and allyl; and aromatic hydrocarbon groups such as aryl groups including phenyl and tolyl, and aralkyl groups including benzyl and phenyl ethyl. Among these groups, groups having 1 to 7 carbon atoms are preferable. For example, alkyl groups such as methyl, ethyl, propyl and isopropyl, alkenyl groups such as vinyl, and aryl groups such as phenyl are preferable, and methyl, ethyl and phenyl are particularly preferable.

$R^3$ is derived from a silyl group protecting a carboxyl group and is an unsubstituted or substituted $C_1$-$C_{10}$ monovalent hydrocarbon group. Examples of $R^3$ include: saturated or unsaturated aliphatic hydrocarbon groups such as alkyl groups including methyl, ethyl, propyl and isopropyl, cycloalkyl groups including cyclohexyl, and alkenyl groups including vinyl and allyl; and aromatic hydrocarbon groups such as aryl groups including phenyl and tolyl, and aralkyl groups including benzyl and phenyl ethyl. Among these groups, groups having 1 to 7 carbon atoms are preferable. For example, alkyl groups such as methyl, ethyl and propyl, alkenyl groups such as vinyl, and aryl groups such as a phenyl are preferable, and methyl, ethyl, vinyl and phenyl are particularly preferable.

In general formula (3), k represents the repeating number of a saturated hydrocarbon group of a spacer connecting the hydrolyzable alkoxysilyl group and the carboxylic acid silyl ester group in the silane coupling agent. The repeating number k of a methylene group in the alkylene group represented by —$(CH_2)_k$— which is a spacer is preferably an integer of 3 to 14, more preferably an integer of 5 to 13, still more preferably an integer of 6 to 11, particularly preferably an integer of 8 to 11, and most preferably an integer of 8 to 10. If the number of spacers is less than 3, synthesis is difficult. If the number of spacers is more than 14, the molecular weight is too large, and adhesive properties may be reduced.

In the formula, the value of a is an integer of 0 to 2, and preferably 0.

In the formula, the value of b is an integer of 0 to 3, preferably an integer of 1 to 3, more preferably 2 or 3. In a case where the value of b is 2 or 3, the structures of $R^3$s may be the same or different.

Note that in the present invention, in a case where b=3 and $R^3$ is an aliphatic saturated monovalent hydrocarbon group such as alkyl group, the repeating number k of a methylene group in the alkylene group represented by —$(CH_2)_k$— which is a spacer is an integer of 6 to 14, preferably an integer of 6 to 11, and more preferably an integer of 8 to 10.

Specific examples of general formula (3) include compounds having the following structures, but are not limited thereto.

[Chem. 13]

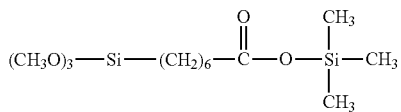

[Chem. 14]

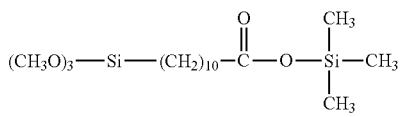

[Chem. 15]

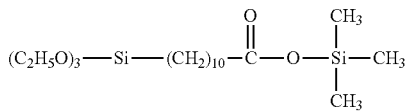

[Chem. 16]

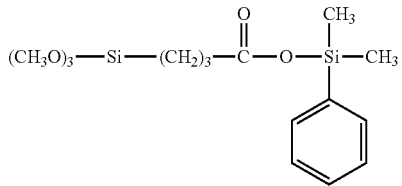

[Chem. 17]

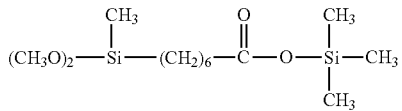

[Chem. 18]

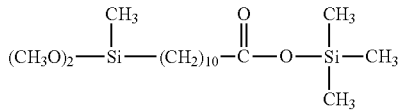

[Chem. 19]

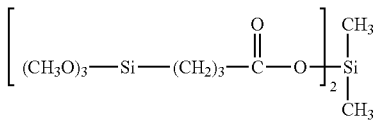

[Chem. 20]

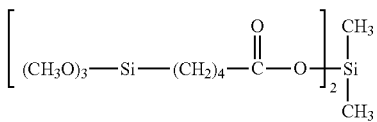

[Chem. 21]

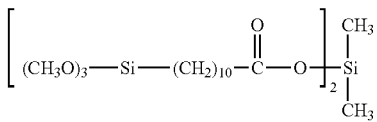

[Chem. 22]

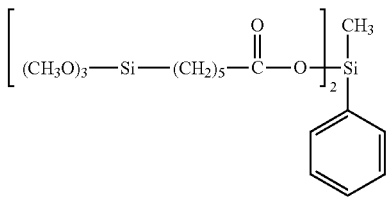

-continued

[Chem. 23]
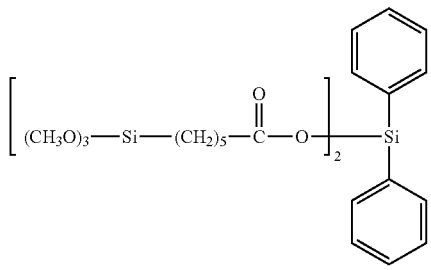

[Chem. 24]
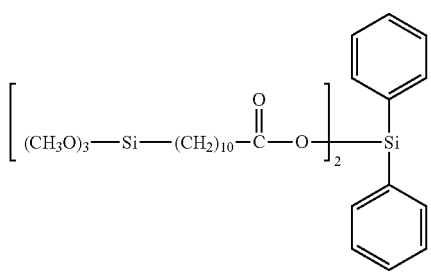

[Chem. 25]
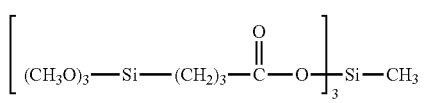

[Chem. 26]
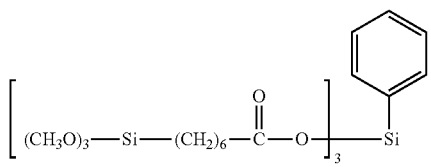

[Chem. 27]
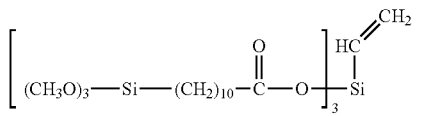

[Chem. 28]
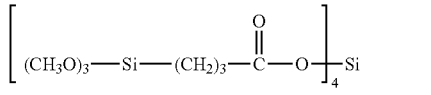

[Chem. 29]
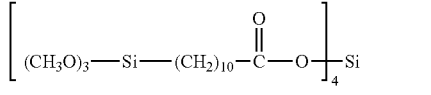

[Chem. 30]
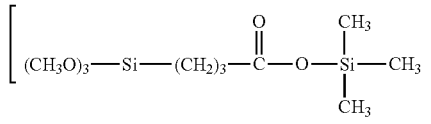

The organic silicon compound of the present invention useful as a silane coupling agent having a carboxylic acid silyl ester group or the like can be produced by, for example, first, preparing a carboxylic acid silyl ester compound having an aliphatic unsaturated group (ethylenically unsaturated group or alkenyl group) at a terminal having the general formula (5), by a dehydrohalogenation reaction of a carboxylic acid having an aliphatic unsaturated group (ethylenically unsaturated group or alkenyl group) at a terminal with a halosilane, and then causing a reaction of the carboxylic acid silyl ester compound with an alkoxysilane having a SiH group (hydrosilyl group) in the presence of a catalyst:

[Chem. 31]

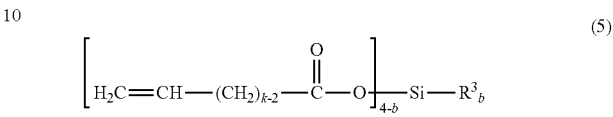
(5)

wherein $R^3$, b and k are as defined above.

In formula (5), in a case where b=3 and $R^3$ represents an aliphatic saturated monovalent hydrocarbon group such as an alkyl group, k is an integer of 6 to 14, preferably an integer of 6 to 11, more preferably an integer of 8 to 10.

The carboxylic acid silyl ester compound having an aliphatic unsaturated group (ethylenically unsaturated group or alkenyl group) at a terminal, represented by general formula (5) can be produced by the following method. The carboxylic acid silyl ester compound can be produced by causing a reaction between a carboxylic acid having an aliphatic unsaturated group (ethylenically unsaturated group or alkenyl group) at a terminal having the general formula (6): and

[Chem. 32]

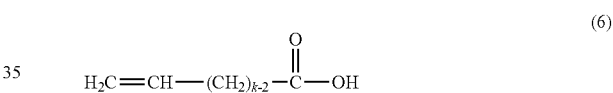
(6)

wherein k is as defined above,
a halosilane having the general formula (7):

[Chem. 33]

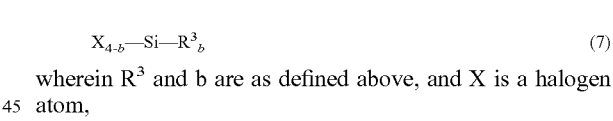
(7)

wherein $R^3$ and b are as defined above, and X is a halogen atom,
in the presence of a hydrogen halide scavenger, for example, at 0° C. to 150° C., preferably at 0° C. to 60° C. for about 30 minutes to 10 hours.

In formula (7), examples of the halogen atom for X include Fluoro, Chloro, Bromo and Iodo, and Chloro is preferable because of easy availability.

A reaction ratio between the carboxylic acid having an aliphatic unsaturated group (ethylenically unsaturated group or alkenyl group) at a terminal represented by formula (6) and the halosilane represented by formula (7) is desirably set such that the molar ratio of a halogen atom in the halosilane to a carboxyl group in the carboxylic acid having an aliphatic unsaturated group (ethylenically unsaturated group or alkenyl group) at a terminal (halogen atom/carboxyl group) is preferably 1 to 2 and more preferably 1.0 to 1.4.

Examples of the hydrogen halide scavenger include tertiary amine compounds such as trimethylamine, triethylamine, tributylamine and pyridine.

The amount of the hydrogen halide scavenger used is preferably to provide 0.8 mol to 3 mol, and particularly preferably 1 mol to 2 mol per a mol of halogen atoms in the halosilane represented by formula (7).

By causing a reaction between the carboxylic acid silyl ester compound having an aliphatic unsaturated group (ethylenically unsaturated group or alkenyl group) at a terminal represented by general formula (5) thus obtained, and an alkoxysilane having a SiH group (hydrosilyl group) in the presence of a catalyst, the organic silicon compound of the present invention can be produced.

That is, the organic silicon compound of the present invention can be obtained by causing a reaction between an alkoxysilyl compound having the general formula (8), i.e., hydrosilyl group-containing (organo) alkoxysilane:

[Chem. 34]

(8)

wherein $R^1$, $R^2$, and a are as defined above, and a carboxylic acid silyl ester compound having an aliphatic unsaturated group (ethylenically unsaturated group or alkenyl group) at a terminal represented by the general formula (5):

[Chem. 35]

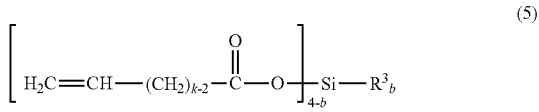

(5)

wherein $R^3$, b, and k are as defined above, in the presence of a platinum group metal catalyst, for example, at 40° C. to 200° C., preferably at 60° C. to 120° C. for about 30 minutes to 15 hours.

In this case, a reaction ratio between the alkoxysilyl compound having formula (8), i.e., hydrosilyl group-containing (organo) alkoxysilane and the carboxylic acid silyl ester compound having an aliphatic unsaturated group (ethylenically unsaturated group or alkenyl group) at a terminal represented by formula (5) is desirably set such that the molar ratio of a SiH group of the alkoxysilyl compound to a terminal aliphatic unsaturated group of the carboxylic acid silyl ester compound having an aliphatic unsaturated group at a terminal (SiH group/terminal aliphatic unsaturated group) is preferably 0.5 to 2, more preferably 1 to 2, and still more preferably 1.0 to 1.5.

Examples of the platinum group metal catalyst used herein include chloroplatinic acid, an alcohol solution of chloroplatinic acid, a reaction product of chloroplatinic acid and an alcohol, a platinum olefin compound complex, a platinum vinyl group-containing siloxane complex and platinum-carrying carbon.

The amount of the platinum group metal catalyst used only needs to be a so-called catalytic amount, and is preferably to provide 0.1 to 1,000 ppm, and particularly preferably 0.3 to 100 ppm in terms of the weight of the platinum group metal with respect to the total weight of the carboxylic acid silyl ester compound having an aliphatic unsaturated group at a terminal and the alkoxysilane having a SiH group.

In each of the above production methods, a solvent may be added during the reaction. Although the solvent is not particularly limited, examples include aromatic hydrocarbons such as toluene, xylene and benzene; aliphatic hydrocarbons such as pentane, hexane, heptane, nonane, octane and decane; ethers such as dimethyl ether, methyl ethyl ether, tetrahydrofuran and dioxane; halogenated hydrocarbons such as perchloroethane, perchloroethylene, trichloroethane, chloroform and carbon tetrachloride; amides such as dimethylformamide; and esters such as ethyl acetate, methyl acetate and butyl acetate.

The organic silicon compound of the present invention has an alkoxysilyl group and a carboxylic acid silyl ester group in one molecule, and regenerates a highly active carboxyl group by hydrolysis, thereby a room temperature-curable organopolysiloxane composition including the organic silicon compound exhibits high stickiness/adhesion to a substrate. Therefore, the organic silicon compound of the present invention is useful as a silane coupling agent, a silylating agent, an adhesion aid, or the like.

The amount of the carboxylic acid silyl ester group-containing silane coupling agent as component (C) blended is 0.1 to 15 parts by weight, and preferably 0.3 to 10 parts by weight per 100 parts by weight of component (A). If the amount is less than 0.1 parts by weight, sufficient magnesium alloy adhesive properties cannot be obtained. If the amount is more than 15 parts by weight, a cured product is hard and brittle, which is further disadvantageous in cost.

[Component (D)]

In the organopolysiloxane composition of the present invention, a filler (D) can be blended. As the filler, a reinforcing or non-reinforcing filler for imparting rubber properties to the composition can be used. Specific examples of such a filler include surface-treated or untreated-, fumed silica, precipitated silica, wet silica, carbon powder, talc and bentonite; surface-treated or untreated-, calcium carbonate, zinc carbonate and magnesium carbonate; and surface-treated or untreated-, calcium oxide, zinc oxide, magnesium oxide, aluminum oxide and aluminum hydroxide. These compounds may be used alone or in combination of two or more thereof.

The amount of the filler blended is preferably to provide 1 to 500 parts by weight, and more preferably 5 to 450 parts by weight per 100 parts by weight of component (A). If the amount is less than 1 part by weight, sufficient adhesive strength to a target magnesium alloy cannot be obtained in some cases due to insufficient rubber strength. If the amount exceeds 500 parts by weight, the viscosity of the material is high, and workability may be poor.

[Other Components]

For the organopolysiloxane composition of the present invention, in addition to the above components, generally known additives, catalysts (particularly, condensation reaction catalysts) and the like may be used as long as there is no adverse influence on curability at room temperature, self-adhesion to a magnesium alloy and the like. Examples of the additive include polyether as a thixotropy improver, coloring agents such as pigment and dye, heat resistance improvers such as red iron and cerium oxide, cold resistance improvers, rust inhibitors, plasticizers, and oil resistance improvers such as potassium methacrylate. Fungicides, antibacterial agents and the like are also added as necessary. Examples of the catalyst (condensation reaction catalyst) include organic metal compounds such as organic tin ester compound, organic tin chelate compound, alkoxytitanium compound and titanium chelate compound, and silicon compound having guanidyl.

For the organopolysiloxane composition of the present invention, in addition to the above components, generally known silane coupling agents (that is, a carbon functional silane compound having a functional group-containing monovalent hydrocarbon group and at least two hydrolyzable groups in a molecule thereof) may also be used as long as there is no adverse influence on curability at room temperature, self-adhesion to a magnesium alloy and the like. Examples thereof include epoxy group-containing alkoxysilanes such as 2-(3,4-epoxy cyclohexyl) ethyl trimethoxysilane, 3-glycidoxypropyl trimethoxysilane, 3-glycidoxypropyl methyldiethoxysilane and 3-glycidoxypropyl triethoxysilane; methacryloxy group-containing alkoxysilanes such as 3-methacryloxypropyl trimethoxysilane, 3-methacryloxypropyl triethoxysilane, 3-methacryloxypropyl methyldimethoxysilane and 3-methacryloxypropyl methyldiethoxysilane; mercapto group-containing alkoxysilanes such as 3-mercaptopropyl trimethoxysilane and 3-mercaptopropylmethyl dimethoxysilane; and ketimine group-containing alkoxysilanes such as N-(1,3-dimethylbutylidene)-3-aminopropyl trimethoxysilane and N-(1,3-dimethylbutylidene))-3-aminopropyl triethoxysilane.

[Preparation of Organopolysiloxane Composition]

A method for preparing the organopolysiloxane composition of the present invention is not particularly limited, and the organopolysiloxane composition can be obtained by mixing predetermined amounts of the above components according to a usual method.

In a case where the organopolysiloxane composition of the present invention is used for adhering to a magnesium alloy, the organopolysiloxane composition is cured (crosslinked) by a condensation reaction at room temperature (23° C.±10° C.) by moisture in the atmosphere, and thereby a silicone rubber cured product exhibiting good self-adhesion to the magnesium alloy even without a chemical conversion treatment is obtained.

The organopolysiloxane composition is cured by being left at room temperature (23° C.±10° C.). As a method for molding the organopolysiloxane composition, a condition for curing the organopolysiloxane composition and the like, known methods and conditions can be adopted depending on the type of the composition.

EXAMPLES

Examples of synthesis, Synthesis Examples, Synthesis Reference Examples, Examples and Comparative Examples are given below for illustrating the invention although the invention is not limited thereto. Note that in the examples, parts and % indicate parts by weight and % by weight, respectively. Viscosity is a value measured with a rotational viscometer at 25° C. according to the method specified in JIS Z 8803.

Hereinafter, examples of synthesis of a terminal aliphatic unsaturated group-containing carboxylic acid silyl ester compound used for synthesizing the organic silicon compound of the present invention, and examples of synthesis (Synthesis Examples) of the organic silicon compound of the present invention are described. Note that a synthesized compounds were identified by $^1$H-NMR, and the synthesis thereof was confirmed.

Example of Synthesis 1

In a separable flask having a capacity of 1,000 ml and equipped with a reflux tube, a dropping funnel, a stirrer and a thermometer, 184 g (1 mol) of 10-undecylenic acid, 119 g (1.1 mol) of trimethylchlorosilane and 500 ml of toluene were put, and 111 g (1.1 mol) of triethylamine was added dropwise thereto over one hour in an ice bath. After completion of the dropwise addition, a reaction was caused at room temperature (23° C., the same applies hereinafter) for six hours. Thereafter, a generated triethylamine hydrochloride was removed by filtration. Furthermore, toluene and unreacted substances were removed (distilled off) at 150° C. at 300 Pa, thus obtaining 10-undecylenic acid trimethylsilyl ester as a target product (collected amount: 226 g, yield: 72%).

$^1$H-NMR (400 MHz, CDCl$_3$)

δ 5.46 (m, 3H), 2.48 (t, 2H), 1.88 (m, 2H), 1.08 (brs, 16H), 0.28 (s, 9H)

Example of Synthesis 2

In a separable flask having a capacity of 500 ml and equipped with a reflux tube, a dropping funnel, a stirrer and a thermometer, 50 g (0.27 mol) of 10-undecylenic acid, 34 g (0.135 mol) of diphenyldichlorosilane and 300 ml of toluene were put, and 30 g (0.3 mol) of triethylamine was added dropwise thereto over 30 minutes in an ice bath. After completion of the dropwise addition, a reaction was caused at room temperature for six hours.

Thereafter, a generated triethylamine hydrochloride was removed by filtration. Furthermore, toluene and unreacted substances were removed (distilled off) at 150° C. at 300 Pa, thus obtaining bis(10-undecylenic acid) diphenylsilyl ester as a target product (collected amount: 59 g, yield: 79%).

$^1$H-NMR (400 MHz, CDCl$_3$)

δ 7.36 (m, 10H), 2.51 (t, 4H), 1.88 (m, 4H), 1.08 (brs, 32H), 0.28 (s, 18H)

Example of Synthesis 3

In a separable flask having a capacity of 500 ml and equipped with a reflux tube, a dropping funnel, a stirrer and a thermometer, 43 g (0.5 mol) of 3-butenoic acid, 94 g (0.55 mol) of phenyldimethylchlorosilane and 300 ml of toluene were put, and 55 g (0.55 mol) of triethylamine was added dropwise thereto over 30 minutes in an ice bath. After completion of the dropwise addition, a reaction was caused at room temperature for six hours. Thereafter, a generated triethylamine hydrochloride was removed by filtration. Furthermore, toluene and unreacted substances were removed (distilled off) at 100° C. at 300 Pa, thus obtaining 3-butenoic acid phenyldimethylsilyl ester as a target product (collected amount: 78 g, yield: 71%).

$^1$H-NMR (400 MHz, CDCl$_3$)

δ 7.32 (m, 5H), 5.72 (m, 3H), 2.48 (t, 2H), 0.31 (s, 6H)

Example of Synthesis 4

In a separable flask having a capacity of 500 ml and equipped with a reflux tube, a dropping funnel, a stirrer and a thermometer, 52 g (0.6 mol) of 3-butenoic acid, 29 g (0.2 mol) of methyltrichlorosilane and 300 ml of toluene were put, and 60 g (0.6 mol) of triethylamine was added dropwise thereto over 30 minutes in an ice bath. After completion of the dropwise addition, a reaction was caused at room temperature for six hours. Thereafter, a generated triethylamine hydrochloride was removed by filtration. Furthermore, toluene and unreacted substances were removed (distilled off) at 150° C. at 300 Pa, thus obtaining tris(3-butenoic acid) methylsilyl ester as a target product (collected amount: 52 g, yield: 88%).

$^1$H-NMR (400 MHz, CDCl$_3$)

δ 5.72 (m, 9H), 2.48 (t, 6H), 0.29 (s, 3H)

Example of Synthesis 5

In a separable flask having a capacity of 500 ml and equipped with a reflux tube, a dropping funnel, a stirrer and a thermometer, 69 g (0.8 mol) of 3-butenoic acid, 33 g (0.2 mol) of tetrachlorosilane and 300 ml of toluene were put, and 80 g (0.8 mol) of triethylamine was added dropwise thereto over 30 minutes in an ice bath. After completion of the dropwise addition, a reaction was caused at room temperature for six hours. Thereafter, a generated triethylamine hydrochloride was removed by filtration. Furthermore, toluene and unreacted substances were removed (distilled off) at 150° C. at 300 Pa, thus obtaining tetra(3-butenoic acid) silyl ester as a target product (collected amount: 61 g, yield: 83%).

$^1$H-NMR (400 MHz, CDCl$_3$)

δ 5.72 (m, 12H), 2.48 (t, 8H)

Example of Synthesis 6

In a separable flask having a capacity of 1,000 ml and equipped with a reflux tube, a dropping funnel, a stirrer and a thermometer, 86 g (1 mol) of 3-butenoic acid, 119 g (1.1 mol) of trimethylchlorosilane and 500 ml of toluene were put, and 111 g (1.1 mol) of triethylamine was added dropwise thereto over one hour in an ice bath. After completion of the dropwise addition, a reaction was caused at room temperature (23° C., the same applies hereinafter) for six hours. Thereafter, a generated triethylamine hydrochloride was removed by filtration. Furthermore, toluene and unreacted substances were removed (distilled off) at 120° C. at 2,000 Pa, thus obtaining 3-butenoic acid trimethyl silyl ester as a target product (collected amount: 108 g, yield: 68%).

$^1$H-NMR (400 MHz, CDCl$_3$)

δ 5.72 (m, 3H), 2.48 (t, 2H), 0.28 (s, 9H)

Synthesis Example 1

In a separable flask having a capacity of 500 ml and equipped with a reflux tube, a dropping funnel, a stirrer and a thermometer, 128 g (0.5 mol) of the 10-undecylenic acid trimethylsilyl ester obtained in Example of synthesis 1 and 0.1 g of 0.5% Karstedt catalyst (platinum olefin compound complex) toluene solution were put, and the resulting mixture was heated to 80° C. Next, 61 g (0.5 mol) of trimethoxysilane was added dropwise thereto over two hours while the temperature range was adjusted to 80 to 100° C. After completion of the dropwise addition, a reaction was caused at 80° C. for eight hours. Thereafter, unreacted substances were removed at 150° C. at 300 Pa, thus obtaining 11-trimethoxysilylundecanoic acid trimethyl silyl ester as a target product, represented by the following chemical formula (9) (collected amount: 212 g, yield: 91%).

$^1$H-NMR (400 MHz, CDCl$_3$)

δ 3.82 (s, 9H), 2.18 (t, 2H), 1.51 (m, 2H), 1.08 (brs, 14H), 0.78 (t, 2H), 0.28 (s, 9H)

[Chem. 36]

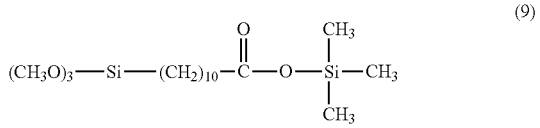

(9)

Synthesis Example 2

In a separable flask having a capacity of 500 ml and equipped with a reflux tube, a dropping funnel, a stirrer and a thermometer, 25 g (0.045 mol) of the bis(10-undecylenic acid) diphenylsilyl ester obtained in Example of synthesis 2 and 0.05 g of 0.5% Karstedt catalyst (platinum olefin compound complex) toluene solution were put, and the resulting mixture was heated to 80° C. Next, 15 g (0.12 mol) of trimethoxysilane was added dropwise thereto over two hours while the temperature range was adjusted to 80 to 100° C. After completion of the dropwise addition, a reaction was caused at 80° C. for eight hours. Thereafter, unreacted substances were removed at 150° C. at 300 Pa, thus obtaining bis(11-trimethoxysilylundecanoic acid) diphenylsilyl ester as a target product, represented by the following chemical formula (10) (collected amount: 39 g, yield: 93%).

$^1$H-NMR (400 MHz, CDCl$_3$)

δ 7.36 (m, 10H), 3.82 (s, 18H), 2.18 (t, 4H), 1.51 (m, 4H), 1.08 (brs, 28H), 0.78 (t, 4H), 0.28 (s, 18H)

[Chem. 37]

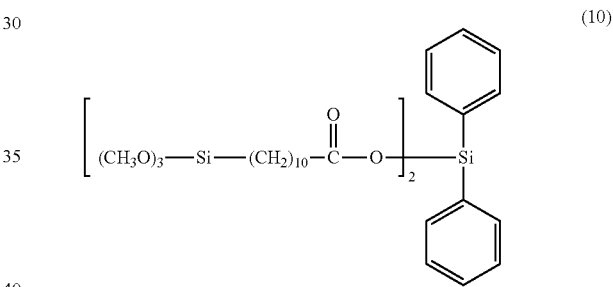

(10)

Synthesis Example 3

In a separable flask having a capacity of 500 ml and equipped with a reflux tube, a dropping funnel, a stirrer and a thermometer, 66 g (0.3 mol) of the 3-butenoic acid phenyldimethylsilyl ester obtained in Example of synthesis 3 and 0.05 g of 0.5% Karstedt catalyst (platinum olefin compound complex) toluene solution were put, and the resulting mixture was heated to 80° C. Next, 36 g (0.3 mol) of trimethoxysilane was added dropwise thereto over two hours while the temperature range was adjusted to 80 to 100° C. After completion of the dropwise addition, a reaction was caused at 80° C. for eight hours. Thereafter, unreacted substances were removed at 100° C. at 300 Pa, thus obtaining 4-trimethoxysilylbutanoic acid phenyldimethylsilyl ester as a target product, represented by the following chemical formula (11) (collected amount: 79 g, yield: 91%).

$^1$H-NMR (400 MHz, CDCl$_3$)

δ 7.18 (m, 10H), 3.82 (s, 9H), 2.26 (t, 2H), 1.86 (m, 2H), 0.78 (t, 2H), 0.31 (s, 6H)

[Chem. 38]

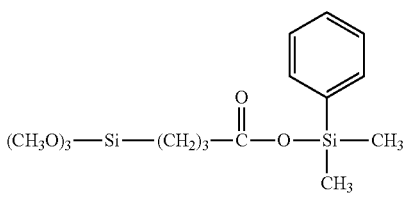

(11)

Synthesis Example 4

In a separable flask having a capacity of 500 ml and equipped with a reflux tube, a dropping funnel, a stirrer and a thermometer, 29 g (0.1 mol) of the tris(3-butenoic acid) methylsilyl ester obtained in Example of synthesis 4 and 0.05 g of 0.5% Karstedt catalyst (platinum olefin compound complex) toluene solution were put, and the resulting mixture was heated to 80° C. Next, 36 g (0.3 mol) of trimethoxysilane was added dropwise thereto over two hours while the temperature range was adjusted to 80 to 100° C. After completion of the dropwise addition, a reaction was caused at 80° C. for eight hours. Thereafter, unreacted substances were removed at 150° C. at 300 Pa, thus obtaining tris(4-trimethoxysilylbutenoic acid) methylsilyl ester as a target product, represented by the following chemical formula (12) (collected amount: 60 g, yield: 93%).

$^1$H-NMR (400 MHz, CDCl$_3$)

δ 3.82 (s, 27H), 2.26 (t, 6H), 1.86 (m, 6H), 0.78 (t, 6H), 0.29 (s, 3H)

[Chem. 39]

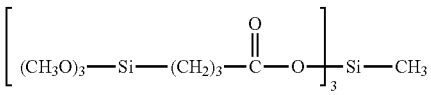

(12)

Synthesis Example 5

In a separable flask having a capacity of 500 ml and equipped with a reflux tube, a dropping funnel, a stirrer and a thermometer, 36 g (0.1 mol) of the tetra(3-butenoic acid) silyl ester obtained in Example of synthesis 5 and 0.05 g of 0.5% Karstedt catalyst (platinum olefin compound complex) toluene solution were put, and the resulting mixture was heated to 80° C. Next, 48 g (0.4 mol) of trimethoxysilane was added dropwise thereto over two hours while the temperature range was adjusted to 80 to 100° C. After completion of the dropwise addition, a reaction was caused at 80° C. for eight hours. Thereafter, unreacted substances were removed at 150° C. at 300 Pa, thus obtaining tetra(4-trimethoxysilylbutanoic acid) silyl ester as a target product, represented by the following chemical formula (13) (collected amount: 75 g, yield: 90%).

$^1$H-NMR (400 MHz, CDCl$_3$)

δ 3.82 (s, 36H), 2.26 (t, 8H), 1.86 (m, 8H), 0.78 (t, 8H)

[Chem. 40]

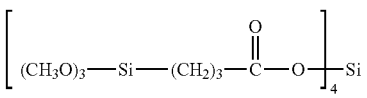

(13)

Synthesis Example 6

In a separable flask having a capacity of 500 ml and equipped with a reflux tube, a dropping funnel, a stirrer and a thermometer, 128 g (0.5 mol) of the 10-undecylenic acid trimethylsilyl ester obtained in Example of synthesis 1 and 0.1 g of 0.5% Karstedt catalyst (platinum olefin compound complex) toluene solution were put, and the resulting mixture was heated to 80° C. Next, 53 g (0.5 mol) of methyldimethoxysilane was added dropwise thereto over two hours while the temperature range was adjusted to 80 to 100° C. After completion of the dropwise addition, a reaction was caused at 80° C. for eight hours. Thereafter, unreacted substances were removed at 150° C. at 300 Pa, thus obtaining 11-methyldimethoxysilylundecanoic acid trimethyl silyl ester as a target product, represented by the following chemical formula (14) (collected amount: 196 g, yield: 94%).

$^1$H-NMR (400 MHz, CDCl$_3$)

δ 3.82 (s, 6H), 2.18 (t, 2H), 1.51 (m, 2H), 1.08 (brs, 14H), 0.78 (t, 2H), 0.38 (s, 3H), 0.28 (s, 9H)

[Chem. 41]

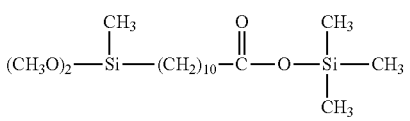

(14)

Synthesis Example 7

In a separable flask having a capacity of 500 ml and equipped with a reflux tube, a dropping funnel, a stirrer and a thermometer, 128 g (0.5 mol) of the 10-undecylenic acid trimethylsilyl ester obtained in Example of synthesis 1 and 0.1 g of 0.5% Karstedt catalyst (platinum olefin compound complex) toluene solution were put, and the resulting mixture was heated to 80° C. Next, 82 g (0.5 mol) of triethoxysilane was added dropwise thereto over two hours while the temperature range was adjusted to 80 to 100° C. After completion of the dropwise addition, a reaction was caused at 80° C. for eight hours. Thereafter, unreacted substances were removed at 150° C. at 300 Pa, thus obtaining 11-triethoxysilylundecanoic acid trimethyl silyl ester as a target product, represented by the following chemical formula (15) (collected amount: 219 g, yield: 92%).

$^1$H-NMR (400 MHz, CDCl$_3$)

δ 3.92 (q, 6H), 2.18 (t, 2H), 1.89 (t, 9H), 1.51 (m, 2H), 1.08 (brs, 14H), 0.78 (t, 2H), 0.28 (s, 9H)

[Chem. 42]

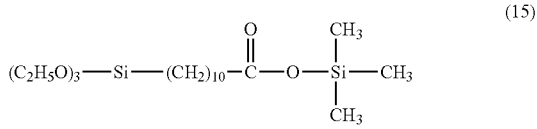
(15)

Synthesis Reference Example 1

In a separable flask having a capacity of 500 ml and equipped with a reflux tube, a dropping funnel, a stirrer and a thermometer, 79 g (0.5 mol) of the 3-butenoic acid trimethylsilyl ester obtained in Example of synthesis 6 and 0.1 g of 0.5% Karstedt catalyst (platinum olefin compound complex) were put, and the resulting mixture was heated to 80° C. Next, 61 g (0.5 mol) of trimethoxysilane was added dropwise thereto over two hours while the temperature range was adjusted to 80 to 100° C. After completion of the dropwise addition, a reaction was caused at 80° C. for eight hours. Thereafter, unreacted substances were removed at 130° C. at 300 Pa, thus obtaining 4-trimethoxysilylbutanoic acid trimethyl silyl ester as a target product, represented by the following chemical formula (16) (collected amount: 124 g, yield: 89%).

$^1$H-NMR (400 MHz, CDCl$_3$)

δ 3.82 (s, 9H), 2.26 (t, 2H), 1.86 (m, 2H), 0.78 (t, 2H), 0.28 (s, 9H)

[Chem. 43]

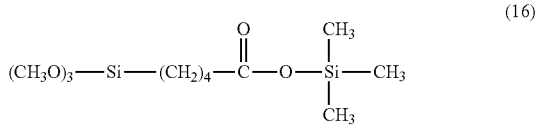
(16)

Hereinafter, preparation examples (Examples) of an organopolysiloxane composition using the organic silicon compound of the present invention are described.

Example 1

(Component A) 100 parts of dimethylpolysiloxane having a viscosity of 20,000 mPas and being blocked at both terminal ends of the molecular chain with hydroxy groups each bonded to a silicon atom (silanol groups), and (component D) 100 parts of heavy calcium carbonate surface-treated with paraffin were uniformly mixed. To the resulting mixture, (component B) 9 parts of vinyltributanoxime silane and 0.6 parts of dibutyltin dilaurate, and (component C) 1 part of the 11-trimethoxysilylundecanoic acid trimethylsilyl ester obtained in Synthesis Example 1 were added and mixed under moisture shut-off until the mixture became uniform, thus preparing Composition 1.

Example 2

Composition 2 was prepared in the same manner as Example 1 except that (component C) 1 part of the bis(1 1-trimethoxysilylundecanoic acid) diphenylsilyl ester obtained in Synthesis Example 2 was used instead of (component C) 1 part of 11-trimethoxysilylundecanoic acid trimethyl silyl ester.

Example 3

Composition 3 was prepared in the same manner as Example 1 except that (component C) 1 part of the 4-trimethoxysilylbutanoic acid phenyldimethylsilyl ester obtained in Synthesis Example 3 was used instead of (component C) 1 part of 11-trimethoxysilylundecanoic acid trimethyl silyl ester.

Example 4

Composition 4 was prepared in the same manner as Example 1 except that (component C) 1 part of the tris(4-trimethoxysilylbutenoic acid) methylsilyl ester obtained in Synthesis Example 4 was used instead of (component C) 1 part of 11-trimethoxysilylundecanoic acid trimethyl silyl ester.

Example 5

Composition 5 was prepared in the same manner as Example 1 except that (component C) 1 part of the tetra(4-trimethoxysilylbutanoic acid) silyl ester obtained in Synthesis Example 5 was used instead of (component C) 1 part of 11-trimethoxysilylundecanoic acid trimethyl silyl ester.

Example 6

Composition 6 was prepared in the same manner as Example 1 except that (component C) 1 part of the 11-methyldimethoxysilylundecanoic acid trimethyl silyl ester obtained in Synthesis Example 6 was used instead of (component C) 1 part of 11-trimethoxysilylundecanoic acid trimethyl silyl ester.

Example 7

Composition 7 was prepared in the same manner as Example 1 except that (component C) 1 part of the 11-triethoxysilylundecanoic acid trimethyl silyl ester obtained in Synthesis Example 7 was used instead of (component C) 1 part of 11-trimethoxysilylundecanoic acid trimethyl silyl ester.

Comparative Example 1

Composition 8 was prepared in the same manner as Example 1 except that 1 part of N-2-(aminoethyl)-3-aminopropyltrimethoxysilane was used instead of (component C) 11-trimethoxysilylundecanoic acid trimethyl silyl ester.

Comparative Example 2

Composition 9 was prepared in the same manner as Example 1 except that 1 part of 3-aminopropyltrimethoxysilane was used instead of (component C) 11-trimethoxysilylundecanoic acid trimethyl silyl ester.

Next, each of the compositions immediately after preparation in the above Examples 1 to 7 and Comparative Examples 1 and 2 was sandwiched between magnesium alloy plates (AZ-91D) having a width of 25 mm and a length of 50 mm, and a shear bond test specimen having a bond area of 2.5 mm$^2$ and a bond thickness of 1 mm was prepared. The shear bond test specimen was cured at 23° C. at 50% RH for seven days. Thereafter, a shear bond force and a cohesive failure ratio were measured according to the method specified in JIS K 6249, and comparison of the cohesive failure ratio was performed. The results are shown in Table 1.

TABLE 1

|  | Unit | Example | | | | | | | Comparative Example | |
| --- | --- | --- | --- | --- | --- | --- | --- | --- | --- | --- |
|  |  | 1 | 2 | 3 | 4 | 5 | 6 | 7 | 1 | 2 |
| AZ-91D shear bond force | MPa | 1.1 | 1.1 | 1.2 | 1.0 | 1.1 | 1.0 | 1.0 | 0.4 | 0.3 |
| Cohesive failure ratio | % | 100 | 100 | 100 | 100 | 100 | 100 | 100 | 0 | 0 |

It has been found that the organic silicon compound of the present invention is blended in a room temperature-curable organopolysiloxane composition (silicone rubber composition), thereby excellent adhesion to magnesium alloy of an adherend having very poor adhesiveness is imparted to the silicon rubber cured product obtained by curing the composition. Meanwhile, adhering to a magnesium alloy could not be achieved with an amine-based bonding aid that has been generally used. Therefore, by adding to a room temperature-curable organopolysiloxane composition, the organic silicon compound of the present invention can impart better adhesive properties than a conventional adhesion aid.

Hereinafter, Preparation Examples (Examples) of the organopolysiloxane composition of the present invention are described.

Example 8

To (component A) 100 parts by weight of dimethylpolysiloxane having a viscosity of 5,000 mPas and being blocked at both terminal ends of the molecular chain with hydroxy groups each bonded to a silicon atom (silanol groups), (component D) 100 parts by weight of heavy calcium carbonate surface-treated with a fatty acid (product name; MC coat P-20, manufactured by Maruo Calcium Co., Ltd.) was added and mixed with a mixer. Thereafter, (component B) 10 parts by weight of vinyltributanoxime silane and 0.1 parts by weight of dioctyltin dilaurate, and (component C) 1 part by weight of the 4-trimethoxysilylbutanoic acid trimethylsilyl ester obtained in Synthesis Reference Example 1 were added thereto and thoroughly mixed under reduced pressure to obtain Composition 10.

Example 9

To (component A) 100 parts by weight of dimethylpolysiloxane having a viscosity of 5,000 mPas and being blocked at both terminal ends of the molecular chain with hydroxy groups each bonded to a silicon atom (silanol groups), (component D) 100 parts by weight of heavy calcium carbonate surface-treated with a fatty acid (product name; MC coat P-20, manufactured by Maruo Calcium Co., Ltd.) was added and mixed with a mixer. Thereafter, (component B) 10 parts by weight of vinyltributanoxime silane and 0.1 parts by weight of dioctyltin dilaurate, and (component C) 1 part by weight of the 11-trimethoxysilylundecanoic acid trimethyl silyl ester obtained in Synthesis Example 1 were added thereto and thoroughly mixed under reduced pressure to obtain Composition 11.

Example 10

To (component A) 100 parts by weight of dimethylpolysiloxane having a viscosity of 5,000 mPas and being blocked at both terminal ends of the molecular chain with hydroxy groups each bonded to a silicon atom (silanol groups), (component D) 100 parts by weight of heavy calcium carbonate surface-treated with a fatty acid (product name; MC coat P-20, manufactured by Maruo Calcium Co., Ltd.) was added and mixed with a mixer. Thereafter, (component B) 10 parts by weight of vinyltributanoxime silane and 0.1 parts by weight of dioctyltin dilaurate, and (component C) 1 part by weight of the bis(11-trimethoxysilylundecanoic acid) diphenylsilyl ester obtained in Synthesis Example 2 were added thereto and thoroughly mixed under reduced pressure to obtain Composition 12.

Example 11

To (component A) 100 parts by weight of dimethylpolysiloxane having a viscosity of 5,000 mPas and being blocked at both terminal ends of the molecular chain with hydroxy groups each bonded to a silicon atom (silanol groups), (component D) 100 parts by weight of heavy calcium carbonate surface-treated with a fatty acid (product name; MC coat P-20, manufactured by Maruo Calcium Co., Ltd.) was added and mixed with a mixer. Thereafter, (component B) 10 parts by weight of vinyltributanoxime silane and 0.1 parts by weight of dioctyltin dilaurate, and (component C) 1 part by weight of the 11-trimethoxysilylundecanoic acid trimethylsilyl ester obtained in Synthesis Example 1 and 1 part by weight of N-(1,3-dimethylbutylidene)-3-aminopropyl trimethoxysilane (product name; KBM-9103P, manufactured by Shin-Etsu Chemical Co., Ltd.) were added thereto and thoroughly mixed under reduced pressure to obtain Composition 13.

Comparative Example 3

To (component A) 100 parts by weight of dimethylpolysiloxane having a viscosity of 5,000 mPas and being blocked at both terminal ends of the molecular chain with hydroxy groups each bonded to a silicon atom (silanol groups), (component D) 100 parts by weight of heavy calcium carbonate surface-treated with a fatty acid (product name; MC coat P-20, manufactured by Maruo Calcium Co., Ltd.) was added and mixed with a mixer. Thereafter, (component B) 10 parts by weight of vinyltributanoxime silane, 0.1 parts by weight of dioctyltin dilaurate, and 1 part by weight of 3-aminopropyl trimethoxysilane were added thereto and thoroughly mixed under reduced pressure to obtain Composition 14.

Comparative Example 4

To (component A) 100 parts by weight of dimethylpolysiloxane having a viscosity of 5,000 mPas and being blocked at both terminal ends of the molecular chain with hydroxy groups each bonded to a silicon atom (silanol groups), (component D) 100 parts by weight of heavy calcium carbonate surface-treated with a fatty acid (product name; MC coat P-20, manufactured by Maruo Calcium Co., Ltd.) was added and mixed with a mixer. Thereafter, (component B) 10 parts by weight of vinyltributanoxime silane, 0.1 parts by weight of dioctyltin dilaurate, and 1 part by weight of allylic succinic anhydride silane (product name; X-31-967C, manufactured by Shin-Etsu Chemical Co., Ltd.) were added thereto and thoroughly mixed under reduced pressure to obtain Composition 15.

Comparative Example 5

To (component A) 100 parts by weight of dimethylpolysiloxane having a viscosity of 5,000 mPa·s and being blocked at both terminal ends of the molecular chain with hydroxy groups each bonded to a silicon atom (silanol groups), (component D) 100 parts by weight of heavy calcium carbonate surface-treated with a fatty acid (product name; MC coat P-20, manufactured by Maruo Calcium Co., Ltd.) was added and mixed with a mixer. Thereafter, (component B) 10 parts by weight of vinyltributanoxime silane, 0.1 parts by weight of dioctyltin dilaurate, and 1 part by weight of the 3-butenoic acid trimethylsilyl ester obtained in Synthesis Example 6 were added thereto and thoroughly mixed under reduced pressure to obtain Composition 16.

Each of the compositions immediately after preparation in Examples 8 to 11 and Comparative Examples 3 to 5 was poured into a 2 mm mold and cured at 23° C. at 50% RH for seven days to obtain a 2 mm thick rubber sheet. Rubber properties (hardness, elongation at break, and tensile strength) were measured with the 2 mm thick sheet according to JIS K6249.

Each of the compositions immediately after preparation in Examples 8 to 11 and Comparative Examples 3 to 5 was sandwiched between magnesium alloy plates (AZ-91D) having a width of 25 mm and a length of 50 mm, and a shear bond test specimen having a bond area of 2.5 mm² and a bond thickness of 1 mm was prepared. The shear bond test specimen was cured at 23° C. at 50% RH for seven days. Thereafter, a shear bond force and a cohesive failure ratio were measured according to the method specified in JIS K6249, and comparison of the cohesive failure ratio was performed.

In order to confirm chemical resistance (CVTF resistance), the obtained cured silicone rubber sheet and shear bond test specimen were immersed in CVTF oil [trade name: ULTRA Honda Multi Mafic Fluid] and deteriorated at 150° C. for seven days. Thereafter, the same test to that as in the initial stage of production was performed, thus conducting chemical resistance confirmation test.

Results thereof are shown in Table 2.

TABLE 2

|  |  | Unit | Example | | | | Comparative Example | | |
|---|---|---|---|---|---|---|---|---|---|
|  |  |  | 8 | 9 | 10 | 11 | 3 | 4 | 5 |
| Initial stage of production | Hardness (Type: A) | — | 59 | 58 | 58 | 60 | 62 | 59 | 56 |
|  | Elongation at break | % | 260 | 270 | 260 | 320 | 240 | 280 | 360 |
|  | Tensile strength | MPa | 1.7 | 1.7 | 1.6 | 1.8 | 1.9 | 1.7 | 1.9 |
|  | AZ-91D shear bond force | MPa | 1.5 | 1.6 | 1.4 | 1.5 | 0.6 | 1.4 | 0.3 |
|  | Cohesive failure ratio | % | 100 | 100 | 100 | 100 | 0 | 100 | 0 |
| Chemical resistance | Hardness (Type: A) | — | 13 | 15 | 16 | 14 | 6 | 13 | 20 |
|  | Elongation at break | % | 250 | 310 | 240 | 280 | 410 | 310 | 280 |
|  | Tensile strength | MPa | 0.9 | 1.1 | 1.0 | 1.0 | 0.5 | 0.9 | 1.4 |
|  | AZ-91D shear bond force | MPa | 0.7 | 0.8 | 0.7 | 0.9 | 0.1 | 0.2 | 0.1 |
|  | Cohesive failure ratio | % | 70 | 100 | 100 | 100 | 0 | 0 | 0 |

It is found that the compositions of Examples 8 to 11 each containing the carboxylic acid silyl ester group-containing silane coupling agent of the present invention have high adhesion to AZ-91D both in the initial stage of production and after the chemical resistance test. Meanwhile, the composition of Comparative Example 3 using a generally used amine-based silane coupling agent did not exhibit adhesion (cohesive failure) to AZ-91D at all and deteriorated chemical resistance. The composition of Comparative Example 4 using an allylic succinic anhydride silane coupling agent had good adhesive properties in the initial stage of production, but was peeled off from AZ-91D after the chemical resistance test. The composition of Comparative Example 5 using a carboxylic acid silyl ester compound alone free of hydrolyzable alkoxysilane in a molecule thereof did not exhibit adhesive properties. From the above results, it is indicated that the composition of the present invention has high adhesion to a magnesium alloy both in the initial stage of production and after the chemical resistance test.

The invention claimed is:

1. An organic silicon compound having the general formula (3A):

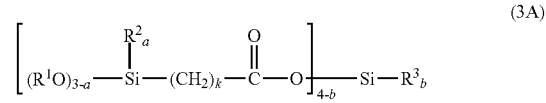

wherein $R^1$, $R^2$, and $R^3$ are each independently a $C_1$-$C_{10}$ monovalent hydrocarbon group, k is an integer of 3 to 14, a is an integer of 0 to 2 and b' is an integer of 0 to 2.

2. An organic silicon compound having the general formula (3B):

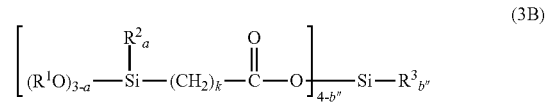

wherein $R^1$, $R^2$, and $R^3$ are each independently a $C_1$-$C_{10}$ monovalent hydrocarbon group, k is an integer of 3 to 14, a is an integer of 0 to 2 and b" is an integer of 1 to 3, with the proviso that at least one of $R^3$ is an aryl group.

3. An organic silicon compound having the general formula (3C):

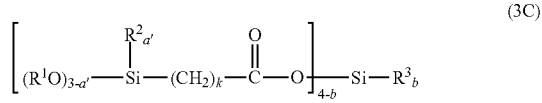
(3C)

wherein $R^1$, $R^2$, and $R^3$ are each independently a $C_1$-$C_{10}$ monovalent hydrocarbon group, k is an integer of 3 to 14, a' is 1 or 2 and b is an integer of 0 to 3, with the proviso that k is an integer of 6 to 14 in a case where $R^3$ is an aliphatic saturated monovalent hydrocarbon group and b=3.

4. A method for producing the organic silicon compound (3A) of claim 1,
the method comprising reacting a carboxylic acid silyl ester compound having an aliphatic unsaturated group at a terminal, represented by the general formula (5A):

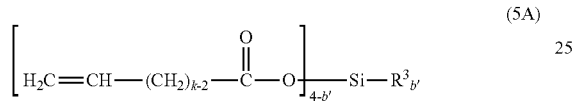
(5A)

wherein $R^3$, b' and k are as defined for general formula (3A), with an alkoxysilane having the general formula (8):

(8)

wherein $R^1$, $R^2$ and a are as defined for general formula (3A).

5. The method for producing the organic silicon compound according to claim 4, wherein the carboxylic acid silyl ester compound having an aliphatic unsaturated group at a terminal, represented by the general formula (5A) is obtained by a reaction between
a carboxylic acid having an aliphatic unsaturated group at a terminal, represented by the general formula (6):

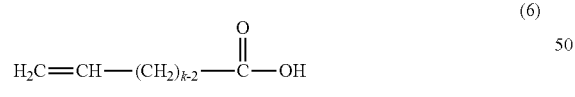
(6)

wherein k is as defined for general formula (3A), and
a halosilane having the general formula (7A):

(7A)

wherein $R^3$ and b' are as defined for general formula (3A), and X is a halogen atom.

6. A method for producing the organic silicon compound (3B) of claim 2,
the method comprising reacting a carboxylic acid silyl ester compound having an aliphatic unsaturated group at a terminal, represented by the general formula (5B):

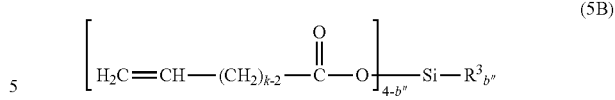
(5B)

wherein $R^3$, b" and k are as defined for general formula (3B) with the proviso that at least one of $R^3$ is an aryl group, with an alkoxysilane having the general formula (8):

(8)

wherein $R^1$, $R^2$ and a are as defined for general formula (3B).

7. The method for producing the organic silicon compound according to claim 6, wherein the carboxylic acid silyl ester compound having an aliphatic unsaturated group at a terminal, represented by the general formula (5B) is obtained by a reaction between
a carboxylic acid having an aliphatic unsaturated group at a terminal, represented by the general formula (6):

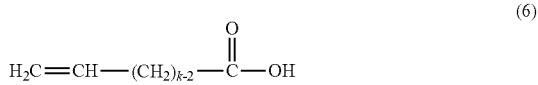
(6)

wherein k is as defined for general formula (3B), and
a halosilane having the general formula (7B):

(7B)

wherein $R^3$ and b" are as defined for general formula (3B), and X is a halogen atom.

8. A method for producing the organic silicon compound (3C) of claim 3,
the method comprising reacting a carboxylic acid silyl ester compound having an aliphatic unsaturated group at a terminal, represented by the general formula (5):

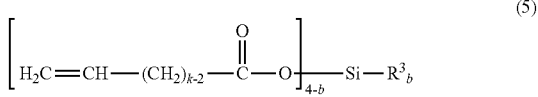
(5)

wherein $R^3$, b and k are as defined for general formula (3C), with the proviso that k is an integer of 6 to 14 in a case where $R^3$ is an aliphatic saturated monovalent hydrocarbon group and b=3,
with an alkoxysilane having the general formula (8C):

(8C)

wherein $R^1$, $R^2$ and a' are as defined for general formula (3C).

9. The method for producing the organic silicon compound according to claim 8, wherein the carboxylic acid silyl ester compound having an aliphatic unsaturated group at a terminal, represented by the general formula (5) is obtained by a reaction between a carboxylic acid having an aliphatic unsaturated group at a terminal, represented by the general formula (6):

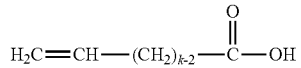

(6)

wherein k is as defined for general formula (3C), and a halosilane having the general formula (7):

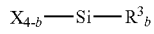

(7)

wherein $R^3$ and b are as defined for general formula (3C), and X is a halogen atom.

* * * * *